US006836487B1

(12) United States Patent
Farmer et al.

(10) Patent No.: US 6,836,487 B1
(45) Date of Patent: Dec. 28, 2004

(54) SPECTRALLY TAILORED RAMAN PUMP LASER

(75) Inventors: Jason N. Farmer, Seattle, WA (US); Richard D. Romea, Seattle, WA (US); Scott H. Keeney, Seattle, WA (US)

(73) Assignee: nLight Photonics Corporation, Vancouver, WA (US)

( * ) Notice: Subject to any disclaimer, the term of this patent is extended or adjusted under 35 U.S.C. 154(b) by 85 days.

(21) Appl. No.: 09/945,381

(22) Filed: Aug. 31, 2001

(51) Int. Cl.[7] .............................. H01S 3/30; H01S 3/08
(52) U.S. Cl. ............................ 372/3; 372/92; 372/102
(58) Field of Search ........................... 372/102, 3, 6, 372/92, 99

(56) References Cited

U.S. PATENT DOCUMENTS

| | | | |
|---|---|---|---|
| 4,699,452 A | 10/1987 | Mollenauer et al. | |
| 4,881,790 A | 11/1989 | Mollenauer | |
| 4,923,270 A | 5/1990 | Carter | |
| 5,115,444 A | 5/1992 | Kirkby et al. | |
| 5,163,058 A | 11/1992 | Farries et al. | |
| 5,319,668 A | 6/1994 | Luecke | |
| 5,351,262 A | 9/1994 | Poguntke et al. | |
| 5,386,426 A | 1/1995 | Stephens | |
| 5,510,920 A | 4/1996 | Ota | |
| 5,528,612 A | 6/1996 | Scheps et al. | |
| 5,570,226 A | 10/1996 | Ota | |
| 5,773,345 A | 6/1998 | Ota | |
| 6,052,394 A | 4/2000 | Lee et al. | |
| 6,130,899 A | 10/2000 | Epworth et al. | |
| 6,192,062 B1 * | 2/2001 | Sanchez-Rubio et al. | 372/92 |
| 6,418,152 B1 * | 7/2002 | Davis | 372/18 |
| 6,612,703 B2 * | 9/2003 | Lowenthal et al. | 353/31 |

FOREIGN PATENT DOCUMENTS

JP 62229891 8/1987

OTHER PUBLICATIONS

"Configurable Three–Wavelength Raman Fiber Laser for Raman Amplification and Dynamic Gain Flattening," M. Mermelstein et al., IEEE Photonics Technology Letterss pp. 1–3, 2001.

"Pump Interactions in a 100–nm Bandwidth Raman Amplifier," Howard Kidorf et al., IEEE Photonics Technology Letters, vol. 11 No. 5; pp. 530–532, May 1999.

* cited by examiner

Primary Examiner—Minsun Oh Harvey
Assistant Examiner—James Menefee
(74) Attorney, Agent, or Firm—Fulbright & Jaworski LLP.

(57) ABSTRACT

The present invention is directed to a system and method for providing a spectrally tailored Raman pump. The system and method employ an incoherently beam combined laser configuration to combine output beams from a plurality of emitters. Embodiments of the present invention provide emitter devices with electrodes adapted to allow addressability of various emitters. In some embodiments, each emitter is individually addressable thereby allowing the output power of each emitter to be controlled by a drive current. In another embodiment, blocks of emitters are coupled to a single current source. Each emitter of a block is operated at a common power level. In certain embodiments, blocks of emitters are driven at current levels significantly greater than the threshold current for the emitters to increase operating efficiency. Moreover, certain embodiments vary emitter spacing to increase linear power density and/or to allocate additional power to the blue end of the Raman pump. By providing spectral tailoring, embodiments of the present invention are capable of providing reasonable flat Raman gain over relatively broad spectrum.

20 Claims, 7 Drawing Sheets

SPECTRALLY TAILORED RAMAN PUMP LASER

BACKGROUND OF THE INVENTION

At the present time, telecommunication systems are largely based on fiber optic cables. For example, optical networks based on fiber optic cables are currently utilized to transport Internet traffic and traditional telephony information. In such applications, it is frequently necessary to provide an optical signal over significant distances (e.g., hundreds of kilometers). As optical signals travel through the optical fibers, a portion of their power is transferred to the fiber, scattered, or otherwise lost. Over appreciable distances, the optical signals become significantly attenuated. To address the attenuation, optical signals are amplified. Typical optical amplifiers include rare earth doped amplifiers (e.g., Erbium-doped fiber amplifiers).

Also, Raman amplifiers may be utilized. A Raman amplifier relies upon the Raman scattering effect. The Raman scattering effect is a process in which light is frequency downshifted in a material. The frequency downshift results from a nonlinear interaction between light and the material. The difference in frequency between the input light and the frequency downshifted light is referred to as the Stokes shift which in silica fibers is of the order 13 THz.

When photons of two different wavelengths are present in an optical fiber, Raman scattering effect can be stimulated. This process is referred to as stimulated Raman scattering (SRS). In the SRS process, longer wavelength photons stimulate shorter wavelength photons to experience a Raman scattering event. The shorter wavelength photons are destroyed and longer wavelength photons, identical to the longer wavelength photons present initially, are created. The excess energy is conserved as an optical phonon (a lattice vibration). This process results in an increase in the number of longer wavelength photons and is referred to as Raman gain.

The probability that a Raman scattering event will occur is dependent on the intensity of the light as well as the wavelength separation between the two photons. The interaction between two optical waves due to SRS is governed by the following set of coupled equations:

$$\frac{dI_P}{dz} = -\frac{\lambda_S}{\lambda_P} g_R I_S I_P - \alpha_P I_P$$

$$\frac{dI_S}{dz} = g_R I_S I_P - \alpha_S I_S$$

where $I_s$ is the intensity of the signal light (longer wavelength), $I_p$ is the intensity of the pump light (shorter wavelength), $g_R$ is the Raman gain coefficient, $\lambda_s$ is the signal wavelength, $\lambda_p$ is the pump wavelength, and $\alpha_s$ and $\alpha_p$ are the fiber attenuation coefficients at the signal and pump wavelengths respectively. The Raman gain coefficient, $g_R$, is dependent on the wavelength difference $(\lambda_s - \lambda_p)$ as is well known in the art.

As is well understood in the art, SRS is useful for generating optical gain. Optical amplifiers based on Raman gain are viewed as promising technology for amplification of WDM and DWDM telecommunication signals transmitted on optical fibers. Until recently, Raman amplifiers have not attracted much commercial interest because significant optical gain requires approximately one watt of optical pump power. Lasers capable of producing these powers at the wavelengths appropriate for Raman amplifiers have come into existence only over the past few years. These advances have renewed interest in Raman amplifiers.

A key performance parameter of Raman amplifiers is the gain flatness of the amplifier. Gain flatness can be quantified by measuring the gain ripple (variation in gain experience by the optical channels) across the amplification band. To compensate for non-zero gain ripple, a gain flattening filter may be applied to the optical signal to equalize the gain between channels. However, this is a non-optimal solution, since this approach adds loss and therefore decreases the signal-to-noise (SNR) ratio of the system.

Additionally, a single wavelength pump source generates the gain spectrum depicted in FIG. 1. The gain spectrum is not exceptionally broad and it does not possess low gain ripple. However, for telecommunications systems, it is desirable to achieve low gain ripple over both the C Band (wavelengths from 1530 to 1565 nm) and L band (wavelengths from 1570 to 1610 nm). Additionally, it is anticipated that telecommunication service providers may begin to utilize the S band (wavelengths from 1480 to 1525 nm) and the XL band (wavelengths from 1615 to 1660 nm). However, a single wavelength pump source is not capable of generating flat Raman gain across an entire band.

Accordingly, a plurality of lasers, each operating out a distinct wavelength have been utilized to provide optical gain across a broad amount of spectrum. An example, which uses wavelength division multiplexed lasers, is discussed in *Pump Interactions in 100-nm Bandwidth Raman Amplifier*, H. Kidorf et al., IEEE Photonics Technology Letters, Vol. 11, No. 5, May 1999. Other systems have utilized individually packaged fiber Bragg grating stabilized pump lasers. The individually packaged lasers are placed in, for example, 14 pin butterfly packages. The output beams from the individual devices are either polarization division multiplexed or wavelength division multiplexed into a single beam. To the extent that these systems use more beams, the systems are able to generate a broad and reasonably flat gain spectrum. However, the systems become quite cumbersome and costly when the number of butterfly packages exceeds a relatively small number. Accordingly, the gain flatness that can be achieved cost-effectively is severely limited.

BRIEF SUMMARY OF THE INVENTION

The present invention is directed to a system and method for providing a spectrally tailored Raman pump. The system and method employ an incoherently beam combined laser configuration to combine output beams from a plurality of emitters with each of the emitters providing a different output wavelength. Embodiments of the present invention provide emitter devices with electrodes adapted to allow addressability of various emitters. In some-embodiments, each emitter is individually addressable, thereby allowing the output power of each emitter to be controlled by a drive current. In another embodiment, blocks of emitters are coupled to a single current source. Each emitter of a block is operated at a common current level. In certain embodiments, blocks of emitters are driven at current levels significantly greater than the threshold current for the emitters to optimize the electrical efficiency of the device. Moreover, certain embodiments vary emitter spacing to increase linear power density and/or to allocate additional power to the blue (shorter wavelength) end of the Raman pump. By providing spectral tailoring, embodiments of the present invention are capable of providing flat Raman gain over a broad spectrum.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in a which.

DETAILED DESCRIPTION OF THE INVENTION

Figure 1:
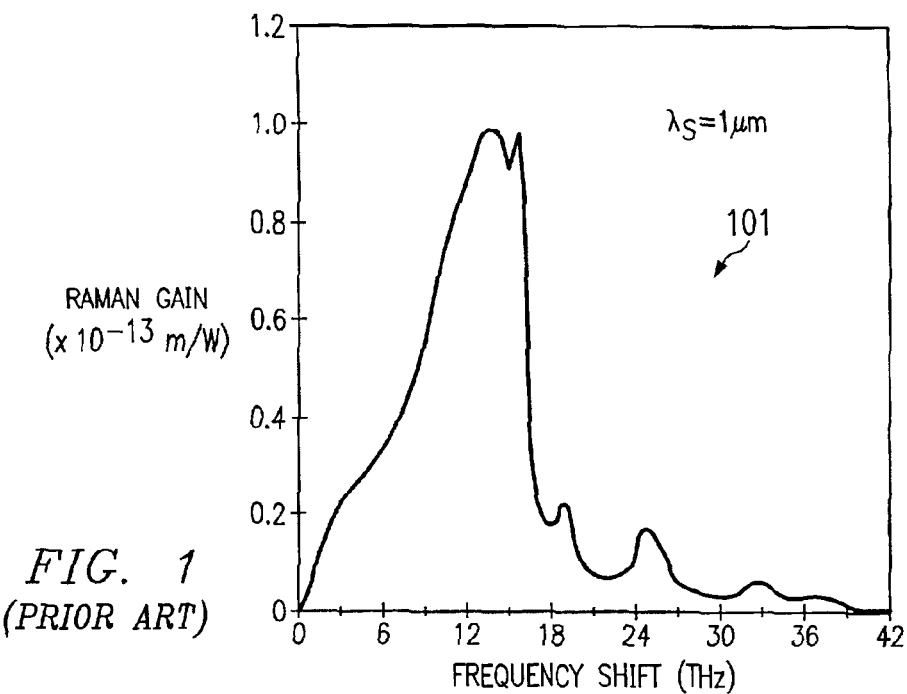
FIG. 1 depicts the Raman gain profile for a silica fiber.

FIG. 1 depicts Raman gain profile 101 in fused silica. Raman gain profile 101 depicts the gain produced by a spectrally limited source (a pump wavelength of 1 micron). The peak of the Raman gain profile is shifted to the red side of the pump wavelength by the Stokes shift which is approximately 13 THz. This attribute of Raman gain profile 101 causes the Raman process to most strongly amplify wavelengths that range from 60 to 100 nm longer than the pump center wavelength.

Figure 2A:
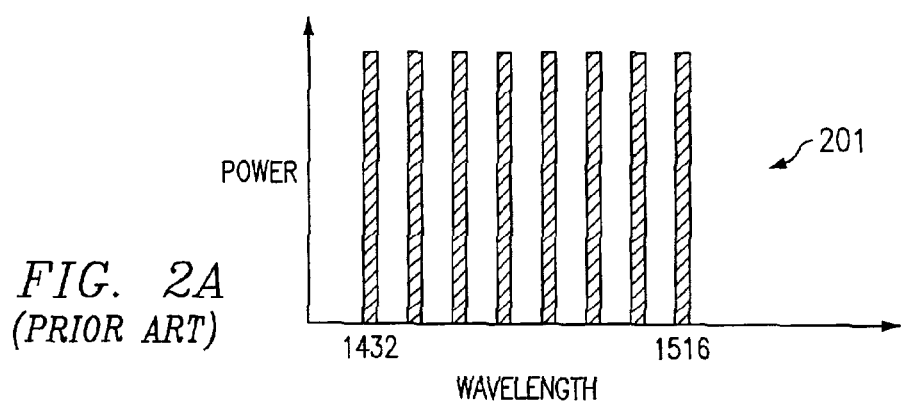
FIG. 2A depicts an exemplary flat Raman pump spectrum.
Figure 2B:
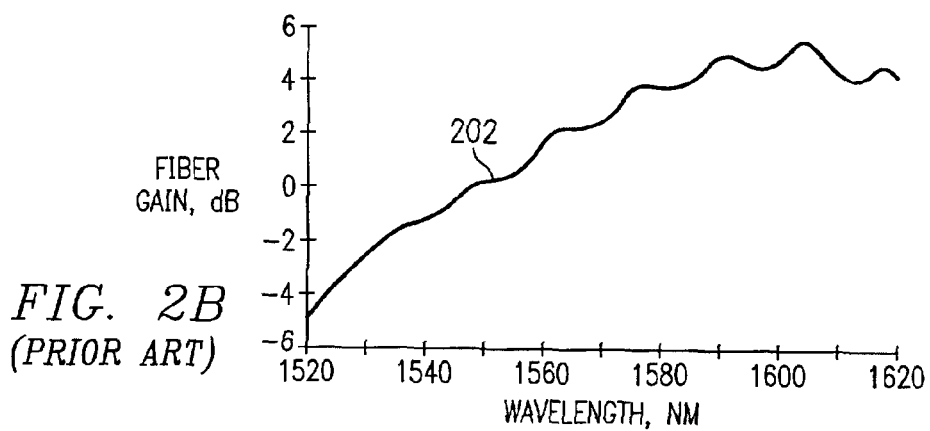
FIG. 2B depicts the Raman gain spectrum resulting from the flat Raman pump spectrum depicted in FIG. 2A.

As shown in *Pump Interactions in 100-nm Bandwidth Raman Amplifier*, FIG. 2A depicts exemplary flat Raman pump spectrum 201. FIG. 2B depicts Raman gain spectrum 202 that results in a silica fiber in response to flat Raman pump spectrum 201. It may be observed that spectrally flat Raman pump 201 does not produce reasonably flat Raman gain. Specifically, Raman gain spectrum 202 exhibits significant gain tilt over the wavelengths from 1520 nm to 1620 nm.

This phenomenon is caused by pump-pump interactions or self-amplification. Self-amplification causes red components (longer wavelengths) of the Raman pump to be amplified by blue components (shorter wavelengths) of the Raman pump. This, in turn, causes greater Raman gain at the red end of the spectrum. Self-amplification of a Raman pump, among other pertinent issues, is discussed by H. Kidorf et al. (Ibid.). In particular, the authors provide an iterative algorithm to model behavior of a Raman amplifier. This iterative algorithm may be utilized to determine the resultant Raman gain from a given Raman pump.

The equation that describes Raman gain from a given Raman pump spectrum is:

$$\frac{\partial I_f(z,\omega)}{dz} = -\alpha I_f(z,\omega) + \int_{<\omega} g(\omega-v)[I_f(z,\omega) + I_b(z,\omega)]dv - \int_{>\omega} g(\omega-v)[I_f(z,\omega) + I_b(z,\omega)]dv$$

where the forward intensity, $I_f$, a function of distance, z, along the fiber, and frequency, ω. Attenuation is represented by α, while g represents the Raman gain profile. This model includes the effects of back-propagating intensity, $I_b$, but for simplicity does not include spontaneous Raman emission or Rayleigh scattering. The actual intensities in the fiber reflect the transfer of power not only from the pumps to the signal waves, but also from the shorter-wavelength pumps to the longer-wavelength pumps.

Utilizing the preceding model, it is possible to determine optimal pump wavelengths powers to obtain reasonably flat Raman gain over particular wavelength range. Exemplary design constraints may include maximum emitter power, minimum emitter wavelength spacings, total number of emitters, individually addressable emitters, or block addressable emitters as will be discussed in greater detail herein below. An optimization program can systematically vary the design parameters within set limits. In an iterative manner, the design parameters can be optimized by examining minimization of gain ripple over a desired wavelength range.

Figure 2C:
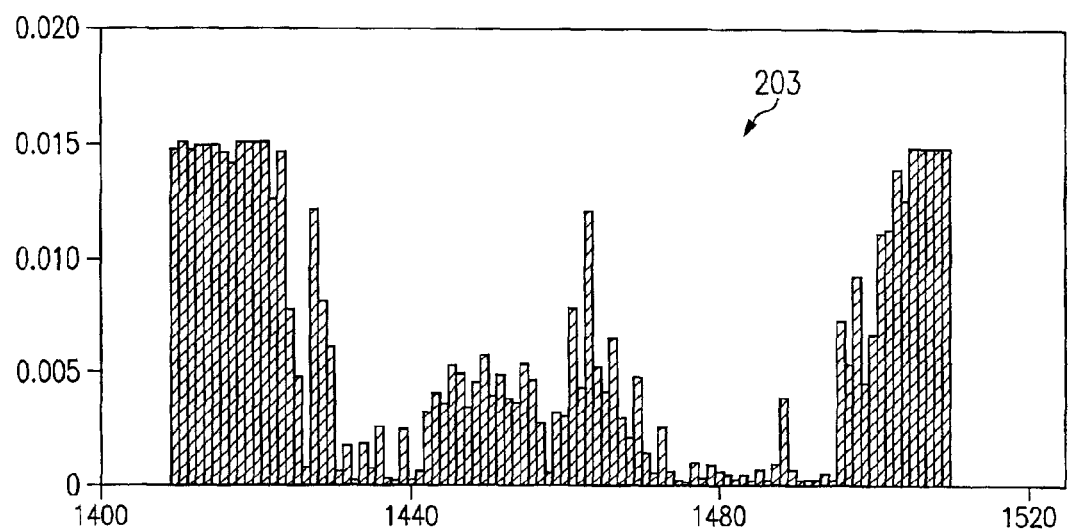
FIG. 2C depicts an exemplary Raman pump spectrum resulting from the output of 100 individually addressable emitters according to embodiments of the present invention.
Figure 4:
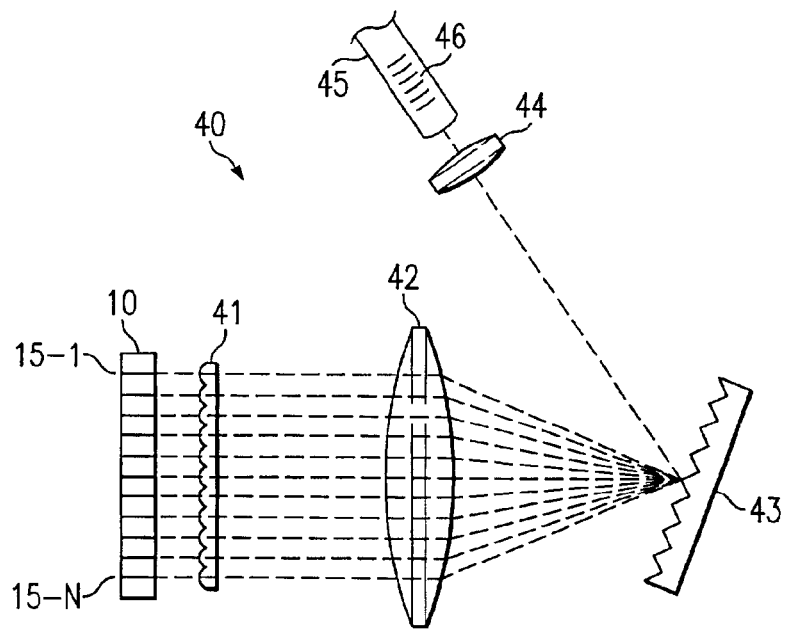
FIG. 4 depicts an exemplary IBC laser according to embodiments of the present invention.

FIG. 2C depicts Raman pump spectrum 203 that may be generated by utilizing an individually addressable emitter array laser (such as depicted in FIG. 4 and discussed herein below). Gain spectrum 204 depicted in FIG. 2D results from pump spectrum 203. Gain spectrum 204 is desirable for Raman pump applications, because it is relatively flat, i.e.

the difference in amplification across the spectrum is less than 0.5 dB. Moreover, gain spectrum 204 is desirable, because it spans both the C and L telecommunication bands.

In this case, pump spectrum 203 is generated by utilizing the outputs from 100 individually addressable emitters. Each of the emitters is forced to lase at a distinct wavelength. The wavelength of each emitter may be advantageously selected such that the emitters are evenly spaced across a relatively broad amount of spectrum. In this case, the aggregate output spectrum spans approximately 100 nm (from approximately 1410 to 1510 nm). By providing such a broad and spectrally tailored pump spectrum, reasonably flat Raman gain 204 can be achieved across a relatively broad spectrum. It shall be appreciated that such an arrangement of emitters may be used to achieve pump spectrum 203 by utilizing an incoherently beam combined (IBC) laser configuration as will be discussed in greater detail below.

Figure 3A:
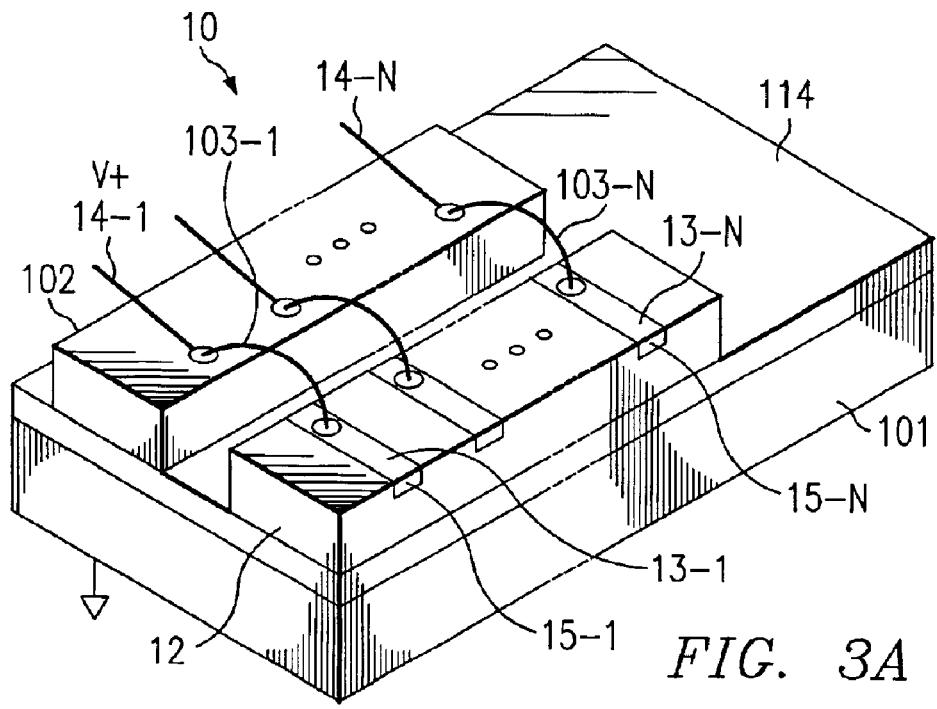
FIG. 3A depicts an exemplary emitter device according to embodiments of the present invention.
Figure 3B:
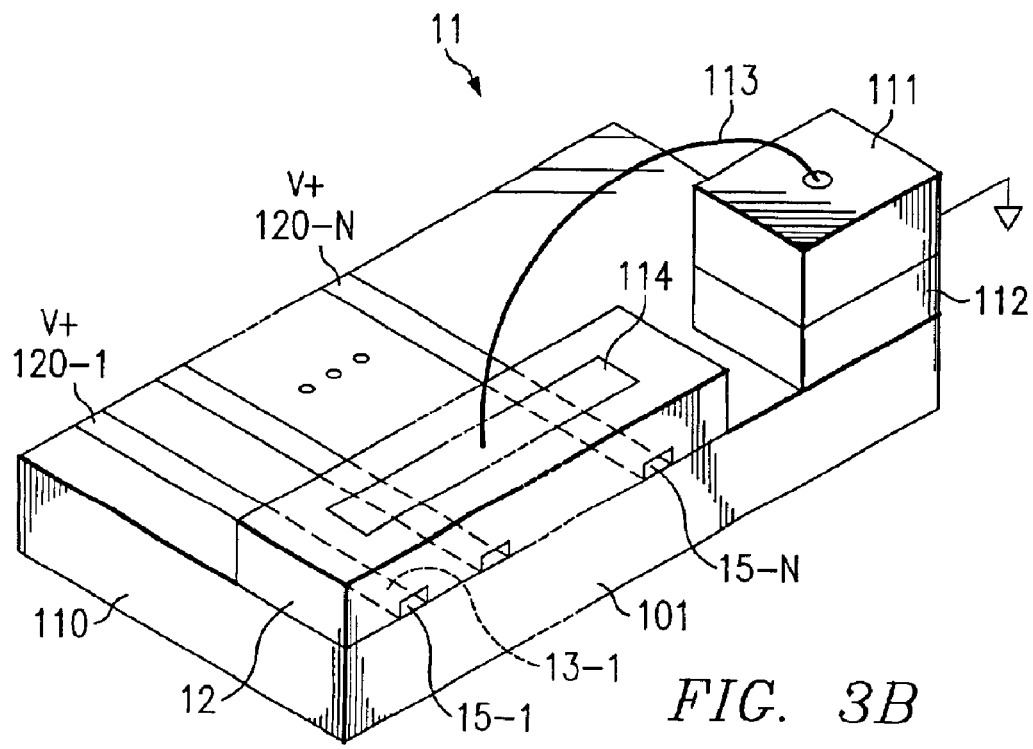
FIG. 3B depicts another exemplary emitter device according to embodiments of the present invention.

FIGS. 3A and 3B depict emitter devices 10 and 11 which allow each individual emitter 15-i of the respective emitter arrays 12 to be addressed individually, i.e. an independent drive current may be provided to each individual emitter 15-i of emitters 15-1 through 15-N. By providing individual addressability, emitters 15-1 through 15-N of emitter devices 10 and 11 may be driven by independent currents to achieve pump spectrum 203 shown in FIG. 2C.

Emitters 15-1 through 15-N are gain elements (typically consisting of semiconductor material, such as GaAlAs, GaAs, InGaAs, InGaAsP, AlGaInAs, and/or the like) which are capable of lasing at particular wavelengths. Any number of designs may be utilized for emitters 15-1 through 15-N including, but not limited to, edge emitters, vertical cavity surface emitting lasers (VCSELs), and grating surface emitting lasers. Accordingly, the term "emitter" is intended to mean any gain material or element capable of lasing in response to feedback.

FIG. 3A depicts emitter device 10 which is implemented by mounting emitter array 12 p-side up. Emitter array 12 includes a plurality of individual emitters 15-1 through 15-N. Electrodes 13-1 through 13-N are placed on top of emitters 15-1 through 15-N utilizing, for example, lithographic techniques. Electrodes 13-1 through 13-N are connected via wire bonds 103-1 to 103-N to cables 14-1 through 14-N conducting current from independent current supplies. Cables 14-1 through 14-N are mounted on insulating block 102. Insulating block 102 maintains the potential difference between the p-side and n-side of the chip. In this case, the entire bottom side of array device 10 has one electrode 114 and the various components are then soldered as a unit to sub-mount 101.

FIG. 3B depicts emitter device 11 which is implemented by mounting emitter array 12 p-side down. This geometry is appropriate to facilitate removal of larger amounts of heat. Specifically, light is generated at the p-side of emitter array 12 and, hence, the majority of the heat generated by emitter array 12 is generated on the p-side. By placing the p-side closer to sub-mount 101, heat may be more efficiently transferred to sub-mount 101. In this case, ground electrode 114 is on top of emitter array 12 and is connected via a wire bond 113 to ground pin 111. Ground pin 111 is insulated from sub-mount 101 via insulator 112. Electrodes 13-1 through 13-N, which are electrically coupled to emitters 15-1 through 15-N, extend underneath emitter array 12. Electrodes 13-1 through 13-N make electrical contract with electrodes 120-1 through 120-N on sub-mount 101 to provide the desired individual addressability.

FIG. 4 depicts IBC laser 40 which can be adapted to produce pump spectrum 203 depicted in FIG. 2C. IBC laser 40 is shown as incorporating emitter device 10 depicted in FIG. 3A. IBC laser 40 may, in lieu thereof, incorporate emitter device 11 depicted in FIG. 3B. The external cavity of IBC laser 40 includes micro-optic 41, collimating optic 42, diffraction grating 43, fiber coupling lens 44, and fiber Bragg component 46 which is embedded inside optical fiber 45.

The light emitted from emitters 15-1 through 15-N is partially collimated by micro-optic 41 which may be implemented as an array of micro-lenses utilizing photolithographic techniques. The partially collimated light is then further collimated by collimating optic 42 (e.g., a lens) such that the chief rays of the beams from individual emitters 15-1 through 15-N intersect or spatially overlap on diffraction grating 43. The beams are then diffracted in the first order by diffraction grating 43 thereby multiplexing the beams. The first order beams are coupled into optical fiber 45 by fiber coupling lens 44. Fiber Bragg filter 46 provides a partially reflective element that returns feedback to emitters 15-1 through 15-N thereby controlling their respective operating wavelengths.

It shall be appreciated that the geometry of the external cavity of IBC laser 40 defines the resonant wavelengths of emitters 15-1 through 15-N. The center wavelength ($\lambda_i$) of the wavelengths fed back to the $i^{th}$ emitter 15-i is given by the equation: $\lambda_i = A[\sin(\alpha_i) + \sin(\beta)]$, where A is the spacing between adjacent rulings on diffraction grating 16, $\alpha_i$ is the angle of incidence of the light from the $i^{th}$ emitter on diffraction grating 16, and $\beta$ is the output angle which is common to all emitters 15-1 through 15-N. Since the feedback to each emitter 15-i varies according to its position on the array, a relatively broad spectrum of output light can be generated by IBC laser 40. Additionally, the ability to combine the output beams incoherently from a large number of emitters 15-1 through 15-N allows IBC laser 40 to economically achieve a relatively high output power.

Although IBC laser 40 utilizes diffraction grating 43 to provide feedback to emitters 15-1 through 15-N and to multiplex their output beams, other feedback and multiplexing elements can be substituted, such as Mach-Zehnder interferometers and arrayed waveguide gratings. Also, transmission diffraction gratings, prisms, holograms, and other dispersive elements can be utilized in lieu of reflective diffraction grating 43. The particular dispersive element used in a given application will influence the geometry of the external cavity.

Figure 2D:
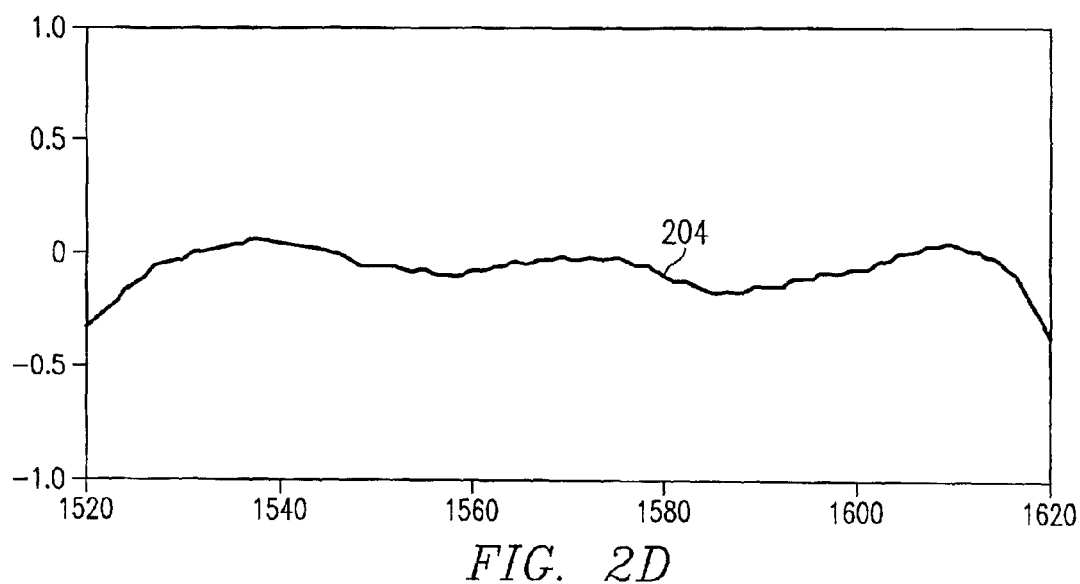
FIG. 2D depicts the Raman gain spectrum resulting from the Raman pump spectrum depicted in FIG. 2C.

By selecting the various characteristics defining the external cavity of IBC laser 40, the center wavelengths of emitters 15-1 through 15-N can be advantageously achieved. The wavelengths can be selected to span pump spectrum 203. Additionally, emitters 15-1 through 15-N may be operated to achieve the desired power levels via provision of drive current to electrodes 13-1 through 13-N. By controlling the wavelengths and output power of emitters 15-1 through 15-N, IBC laser 40 can be utilized to provide Raman gain spectrum 204 as depicted in FIG. 2D. However, IBC laser 40 is not limited to providing Raman gain spectrum 204. IBC laser 40 may provide any suitable Raman pump for any particular application as desired.

As previously noted, Raman gain spectrum 204 is reasonably flat, because more power is allocated to the blue side of the spectrum as compared to the red side of the spectrum. In this embodiment, this is achieved by providing different currents to emitters 15-1 through 15-N via their individual electrodes 13-1 through 13-N. However, it shall be appreciated that additional power can also be allocated to the blue side of the spectrum by modifying emitter spacings on either emitter device 10 or 11. Specifically, the emitter spacing can be relatively smaller for the blue side of the Raman pump spectrum than for the red side of the Roan pump spectrum. By modifying the emitter spacing, more power may be allocated to the blue side of the spectrum to address pump self-amplification.

It shall be appreciated that the IBC laser 40 provides significant advantages. In particular, the number of emitters 15-1 through 15-N and the limited wavelength separation of the output beams from emitters 15-1 through 15-N allows IBC laser 40 to be tuned to achieve reasonably flat Raman gain even if particular emitters of emitters 15-1 through 15-N are inoperable. For example, output power from neighboring emitters may be selectively increased or decreased to adapt to the inoperability of a given emitter. This ability to tolerate emitter failure decreases the manufacturing cost of IBC laser 40 for use as a Raman pump. Specifically, a far greater manufacturing yield may be obtained for IBC laser 40. Additionally, the useful lifespan of IBC laser 40 may be significantly extended by allowing IBC laser 40 to be tuned, either autonomously or manually, when particular emitters fail after extended use.

Figure 5A:
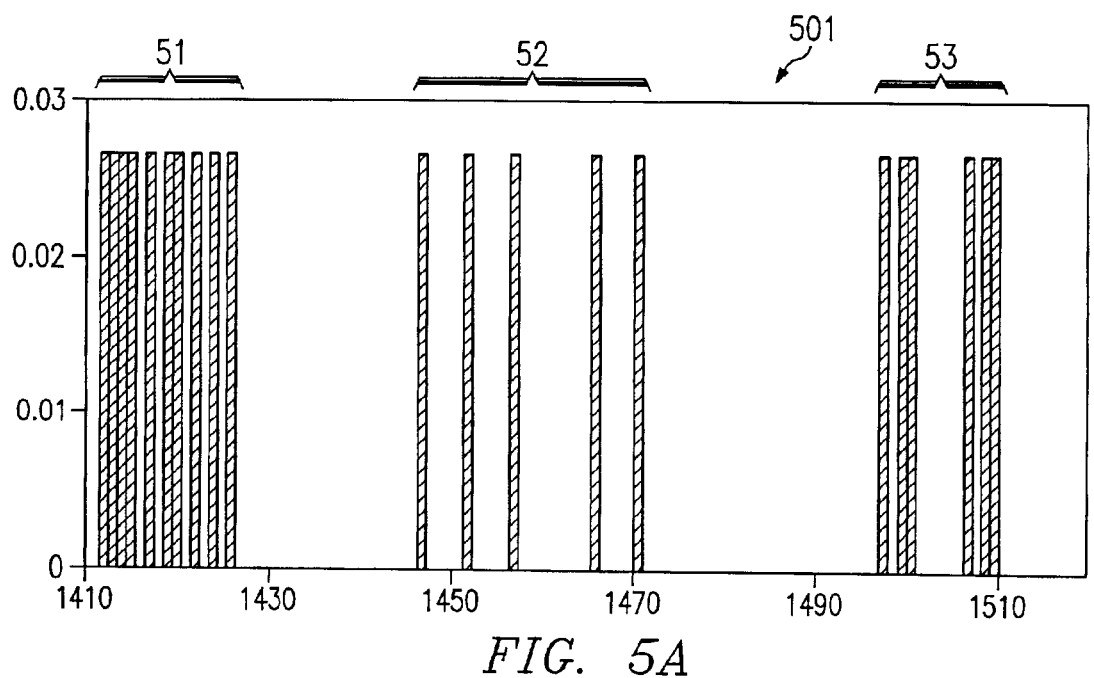
FIG. 5A depicts an exemplary Raman pump spectrum utilizing block addressable emitters according to embodiments of the present invention.
Figure 5B:
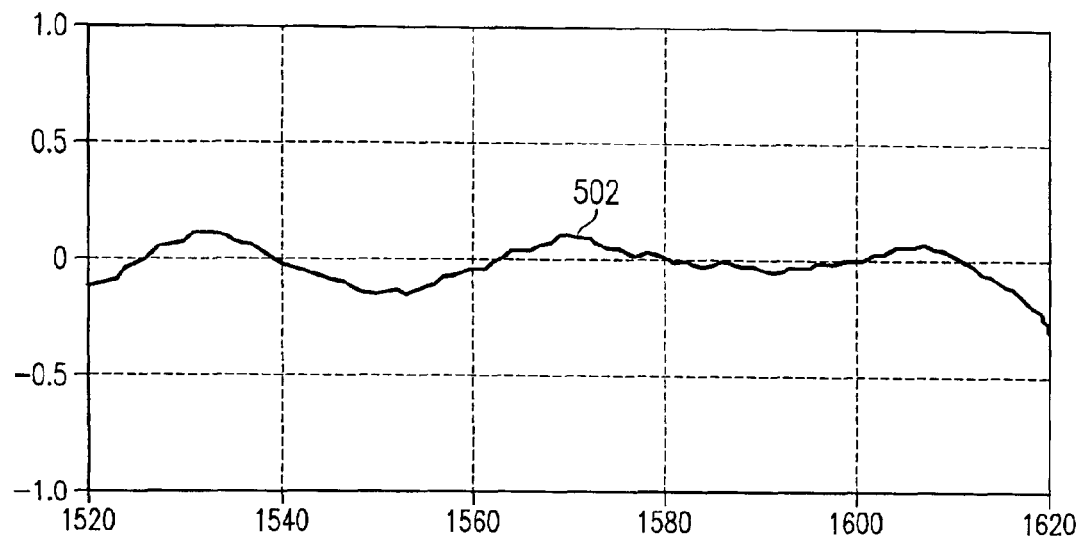
FIG. 5B depicts the resulting Raman gain from the Raman pump depicted in FIG. 5A.

Additionally, in an alternative embodiment, emitters 15-1 through 15-N may be addressed in blocks. FIG. 5A depicts pump spectrum 501 generated by operating blocks of emitters at a similar power level. In an embodiment, three individually addressable blocks of emitters are utilized. The output from the three blocks of emitters are depicted as pump spectral portions 51, 52, and 53. Additionally, each of the emitter blocks advantageously operates to possess an individual output spectrum of at least 10 nm. In other embodiments, each of the emitter blocks advantageously operates to possess an individual output spectrum of 20 to 50 nm. Pump spectrum 501 results in gain spectrum 502 as depicted FIG. 5B which is reasonably flat. Specifically, there is less than 0.5 dB variation in gain over the C and L bands.

Figure 6:
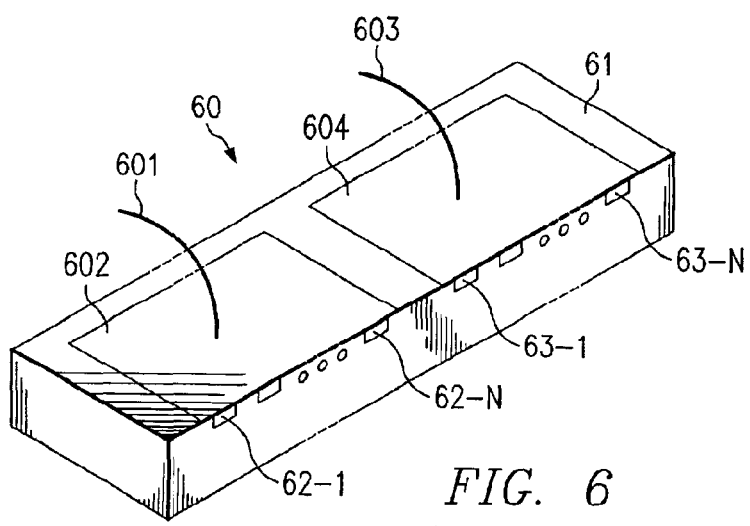
FIG. 6 depicts an emitter device according to embodiments of the present invention.

According to this embodiment of the present invention, emitter device 60 depicted in FIG. 6 can be utilized to provide the pump spectrum depicted in FIG. 5A. Emitter device 60 is also adapted to address Raman self-amplification. Additional power is provided to the blue end of the Raman pump by providing smaller emitter spacings for emitters operating at the blue end of the spectrum. Specifically, smaller emitter spacings will cause an IBC laser to create greater power density at a portion of spectrum associated with the emitters possessing smaller spacings. In this case, the emitter spacings associated with spectral portion 51 are closer than the emitter spacings for spectral portions 52 or 53. Specifically, spectral portion 51 is shown to be generated by emitters 62-1 through 62-N. Spectral portion 52 is shown to be generated by emitters 63-1 through 63-N. The spacings between emitters 62-1 through 62-N are less than the spacings between emitters 63-1 through 63-N. Accordingly, additional power may be allocated to the blue side of pump spectrum 501.

Emitters 62-1 through 62-N are connected to a single electrode 602. Electrode 602 couples the same current source through wire bonds 601 to all of emitters 62-1 through 62-N. Emitters 63-1 through 63-N may be likewise coupled by electrode 604 which is connected to wire bonds 603. Another group (not shown) of emitters can be provided to generate spectral portion 53. There can also be any number emitter groups as desired for a particular application.

Emitter device 60 possesses certain advantages. First, emitter device 60 is adapted to cause a plurality of emitters to operate at substantially the same power level. According to pump spectrum 501 depicted in FIG. 5A, blocks of emitters are operated significantly above the threshold current of the emitters. By doing so, the electrical efficiency (the ratio of the output power to drive current) of the emitters is improved. Moreover, the number of emitters renders emitter device 60 relatively insensitive to failure of a relatively small number of emitters for the purposes of generating reasonably flat Raman gain.

Figure 7:
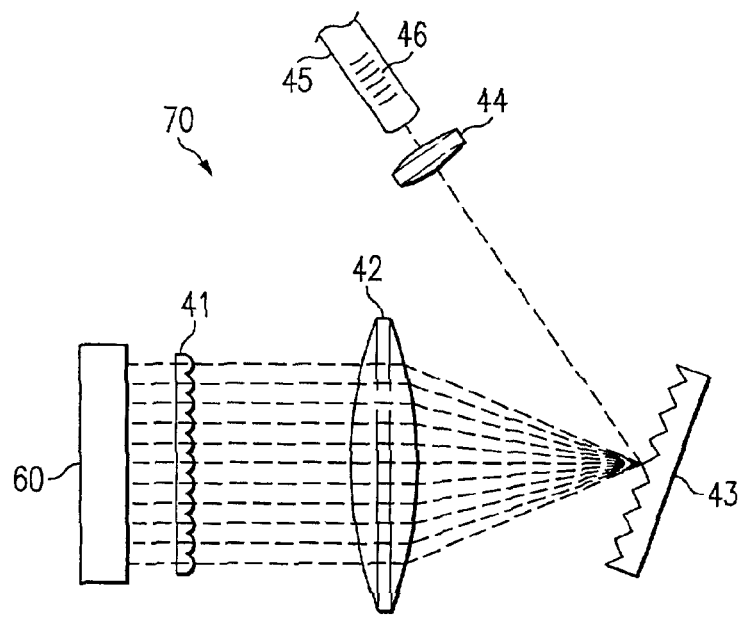
FIG. 7 depicts an exemplary IBC laser according to embodiments of the present invention.

Moreover, emitter device 60 may be incorporated into IBC laser 70 to provide the broad spectral output desired to generate flat Raman gain across the desired spectrum. As depicted in FIG. 7, IBC laser 70 comprises emitter device 60, micro-optic 41, diffraction grating 43, fiber coupling lens 44, optical fiber 45, and fiber Bragg grating 46. The external cavity of IBC laser 70 combines the output beams from emitter device 60 and provides feedback to emitter device 60 in the same manner as discussed above with respect to IBC laser 40. However, in this case, emitter device 60 is adapted via selective emitter spacings to receive selected feedback to thereby achieve pump spectrum 501.

Figure 8:
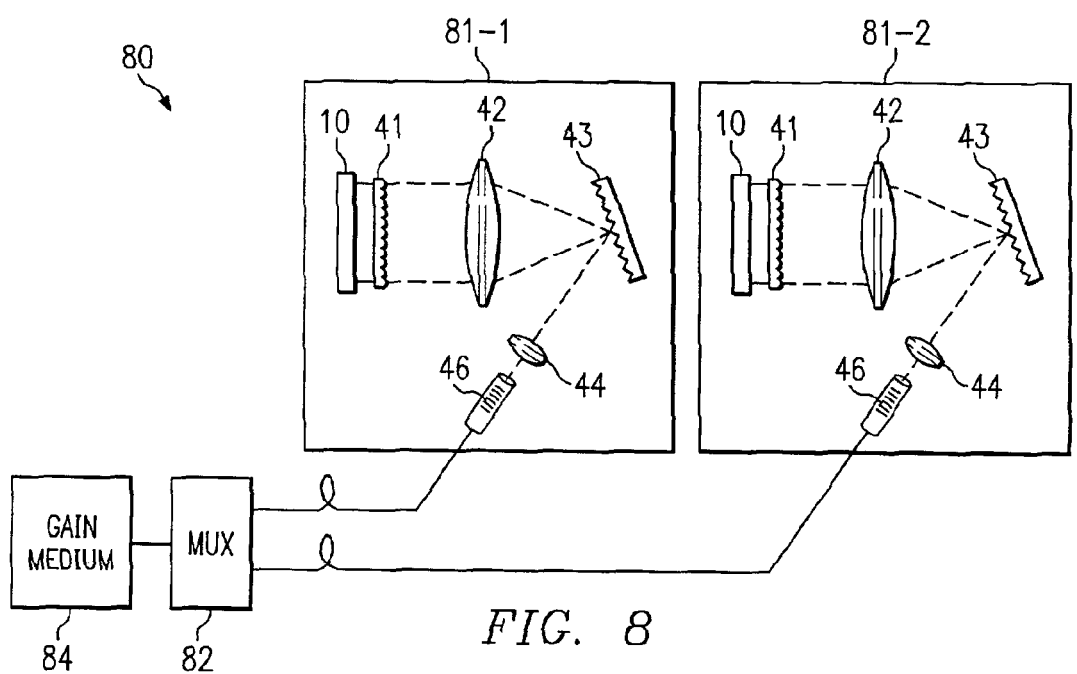
FIG. 8 depicts an exemplary Raman pump source which multiplexes a plural number of IBC lasers.

In other embodiments, multiple emitter devices 10, 11, or 60 may be utilized. For example, the outputs of a plurality of IBC lasers 81 may be multiplexed to generate a desired c pump spectrum. FIG. 8 depicts pump source 80. Pump source 80 includes a plurality of IBC lasers (designated as 81-1 and 81-2). Any of IBC lasers 81-1 and 81-2 may incorporate emitter device 10, 11, or 60. Accordingly, each of IBC lasers 81-1 and 81-2 generates a portion of the respective spectrum to be generated. For example, if emitter device 10 is chosen for this configuration, IBC laser device 81-1 can produce the spectral output for wavelengths from 1410 nm to 1460 nm of pump spectrum 203, while IBC laser 81-2 can produce the spectral output for wavelengths from 1460 nm to 1510 nm. Likewise, if emitter device 60 is selected, IBC laser 81-1 can produce the spectral output for spectral portions 51 and 52 of pump spectrum 501, while IBC laser 81-2 can produce the spectral output for spectral portion 53. The output beams from EBC lasers 81-1 and 81-2 are multiplexed together at MUX 82 utilizing, for example, wavelength division multiplexing or polarization division multiplexing and are delivered to Raman gain medium 84.

Figure 9:
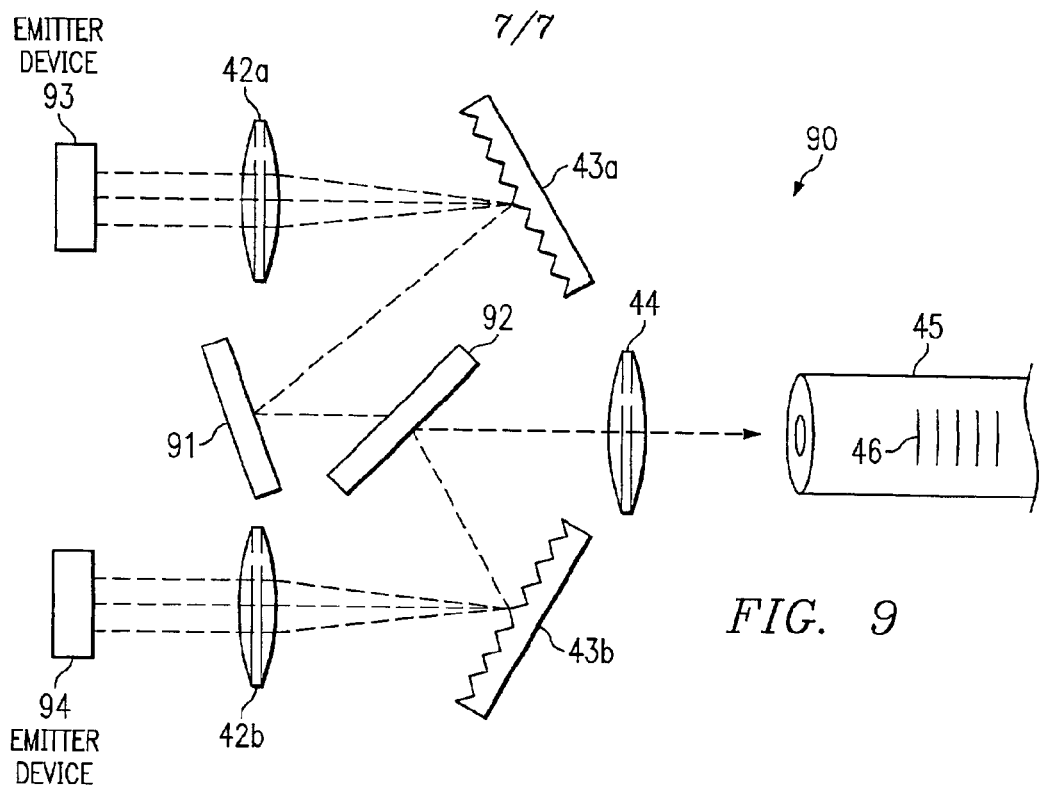
FIG. 9 depicts an exemplary dual cavity IBC laser according to embodiments of the present invention.

FIG. 9 depicts an alternative configuration to employ a plurality of emitter devices 10, 11, or 60. IBC laser 90 includes a dual external cavity including red emitter device 93 and a blue emitter device 84 which may be implemented utilizing emitter device 10, 11, or 60. Red emitter device 93 generates the longer wavelength components of a given Raman pump spectrum, while blue emitter device 94 generates the shorter wavelength components. Each of red emitter device 93 and blue emitter device 94 is associated with a respective collimator (42a and 42b) and diffraction grating (43a and 43b) which combine and separate beams as discussed above with respect to FIG. 4. IBC laser 90 further comprises element 92 which is operable to combine the separate beams from diffraction gratings 43a and 43b. Element 91 is a mirror that reflects the output beams from diffraction grating 43a Element 92 can advantageously be implemented as a dichroic beam combiner (e.g., a dielectric film). As a dichroic beam combiner, element 92 causes the output beams from diffraction grating 43a to be transmitted and causes the output beams from diffraction grating 43b to be reflected.

It shall be appreciated that emitter array 60 achieves different wavelength separations between adjacent emitters by using different physical separations between them. However, it will also be appreciated that closely spaced emitters present a greater heat flux and therefore operate at a higher temperature which can limit their performance and life span. There exists, therefore, a certain minimum allowable separation between emitters. IBC laser 90 allows both emitter array 93 and emitter array 94 to have the minimum allowable physical separation. The wavelength separation between emitters of emitter array 93 is set to the desired value by choosing the appropriate combination of lens 42$a$ and diffraction grating 43$a$ while the wavelength separation between emitters of emitter array 94 is set independently by choosing the appropriate combination of lens 42$b$ and diffraction grating 43$b$ By utilizing the configurations of FIGS. 8 and 9, the present invention is capable of providing flat Raman gain with much less complexity than traditional multiplexed devices. Additionally, these configurations may simplify design of emitters 10, 11, and 60. Specifically, emitters 10, 11, and 60 may be implemented to possess a lower number of emitters on a single array. By providing a smaller number of emitters per array, the overall width of the array is minimized thereby preventing chip bowing, which can substantially degrade the optical performance of the device. Additionally, the wavelength range over which emitters 10, 11, and 60 must operate can be greatly reduced. By limiting the wavelength range over which the device must operate, the device can operate nearer to its gain peak and therefore operate with an optimum efficiency.

Figure 10:
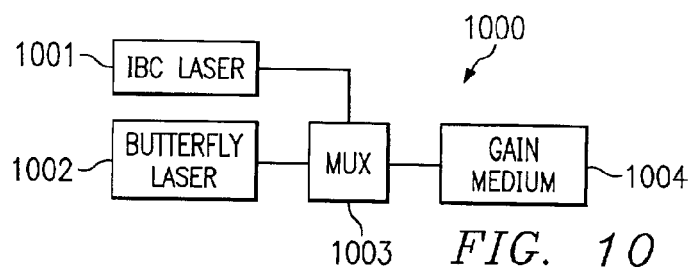
FIG. 10 depicts an exemplary system including an IBC laser and a narrowband laser according to embodiments of the present invention.

In another embodiment, an IBC laser (which may incorporate either emitter device 10, 11, or 60) may be multiplexed with a traditional narrowband laser source (e.g., a butterfly laser 1002 or a semiconductor laser operating at an output power of preferably at least 100 mW) to provide Raman gain over a relatively broad spectrum. System 1000 of FIG. 10 depicts such a configuration where the output of IBC laser 1001 is multiplexed by multiplexer 1003 with the output of butterfly laser 1002 before being applied to gain medium 1004 to generate Raman gain. This configuration is advantageous for several reasons. First, it is appreciated that generating Raman gain over a broad wavelength range requires a Raman pump source that also operates over a broad wavelength range. Emitter array 10, 11, and 60 are based on a semiconductor optical gain elements that possess a finite bandwidth. By combining the output of DBC laser 1001 with the output of butterfly laser 1002, the effective bandwidth of the Raman pump source can be easily and economically increased. Second it is appreciated that the complexity of the thermal engineering scales largely with the total amount of heat that is generated. By combining the output of IBC laser 1001 with the output of a high power butterfly, the thermal engineering of IBC laser 1001 can be done more simply and economically. In alternative embodiments, butterfly laser 1002 can be operated with a wavelength that is either longer than the reddest wavelength of IBC laser 1001, or shorter than the bluest wavelength of IBC laser 1001. This configuration is therefore advantageous because it provides a mechanism to extend the Raman gain capabilities of IBC laser 1001 with a minimum of cost and complexity.

Figure 11:
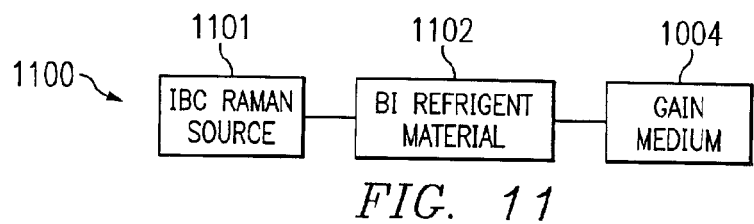
FIG. 11 depicts an exemplary system including Raman pump source coupled to polarization state modification structure according to embodiments of the present invention.
Figure 12:
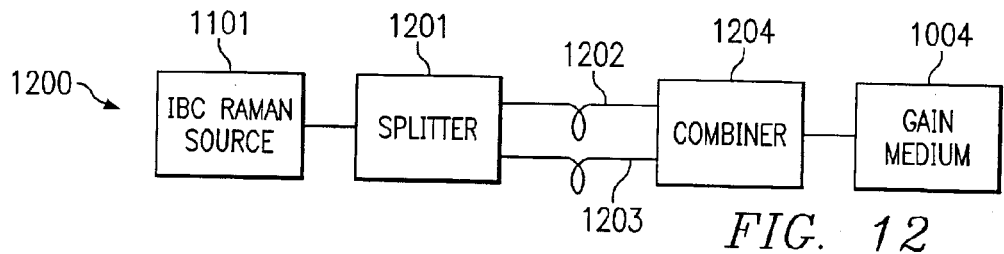
FIG. 12 depicts exemplary systems including Raman pump sources coupled to polarization state modification structure according to embodiments of the present invention.

Additionally, Raman pump sources are most effective if the output light is unpolarized. However, light from laser diodes such as edge emitters is intrinsically polarized. Accordingly, embodiments of the present invention employ various mechanisms to address this issue. First, if two beams are multiplexed together, it is advantageous to utilize polarization multiplexing. Another mechanism is depicted in FIG. 11 in system 1100. IBC Raman source 1101 (which may be any one of the preceding configurations) provides a Raman pump bean to birefringent material 1102 (e.g., lithium nitrate). A time-varying control signal can be applied to birefringent material 1102 to modify its refractive indexes to rotate polarization. The Raman pump beam with a time-dependent polarization state is then applied to gain medium 1004. In another embodiment depicted in FIG. 12, IBC Raman source 1101 is coupled to polarization splitter 1201 which causes orthogonal polarizations of the pump to be split and applied to two different paths 1202 and 1203. After the two orthogonally polarized Raman pump beams have traversed paths 1202 and 1203, where optical path length differs by more than the coherence length of the light, the light is recombined by combiner 1204 into a randomly polarized beam which is applied to gain medium 1004.

The IBC laser configurations discussed above offer numerous advantages. First, the configurations facilitate reasonably flat Raman gain over any particular broad spectrum. In particular, the preceding configurations can be utilized to achieve reasonably flat Raman gain over the S, C, L, and XL bands. Additionally, reasonably flat Raman gain may be provided to multiple bands as desired. The configurations described above also provide reasonably flat Raman gain across a broad spectrum with minimal device complexity, i.e. multiplexing numerous devices is unnecessary. Additionally, the addressability of emitter devices 10, 11, and 60 facilitates achieving flat Raman gain over the desired band(s), by allowing additional power to be allocated to the blue side of the Raman pump. Moreover, the number of emitters placed on emitter devices 10, 11, and 60 allow the various IBC laser configurations to be relatively insensitive to failure of individual emitters on an emitter array thereby decreasing the cost of IBC laser manufacture and extending the useful life of IBC lasers. Certain embodiments of the present invention also achieve greater operating efficiency by operating emitters by current levels well above threshold currents.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed as new and desired to be protected by Letters Patent of the United States is:

1. A method, comprising:
   driving a plurality of gain elements according to groups of multiple gain elements, such that a respective drive signal is provided to each group to cause each gain element of the respective group to operate at substantially the same power within a region of optimal electrical efficiency;
   diffracting beams from said plurality of gain elements toward a partially reflective element using a diffractive element;

generating feedback for said plurality of gain elements using said partially reflective component;

directing respective spectral components of said feedback using said diffractive element toward respective gain elements of said plurality of gain elements; and providing optical power transmitted by said partially reflective component to a Raman amplifier to generate substantially flat Raman gain across at least one telecommunications band.

2. The method of claim 1 wherein said plurality of gain elements are integrated on a single integrated semiconductor element.

3. The method of claim 2 wherein spacings between gain elements generating optical power of shorter wavelengths are smaller than spacings between gain elements generating optical power of longer wavelengths.

4. The method of claim 1 wherein said telecommunications band includes wavelengths from 1530 nm to 1565 nm.

5. The method of claim 1 wherein said telecommunications band includes wavelengths from 1480 nm to 1525 nm.

6. The method of claim 1 wherein said telecommunications band includes wavelengths from 1570 nm to 1610 nm.

7. The method of claim 1 wherein a first group of multiple gain elements is integrated on a first single semiconductor element and a second group of multiple gain elements is integrated on a second single semiconductor element.

8. The method of claim 7 wherein said diffractive element comprises a first diffraction grating and a second diffraction grating.

9. The method of claim 8 further comprising:

combining beams from said first and second diffraction gratings using a dichoric beam combiner before generating said feedback.

10. The method of claim 1 further comprising:

multiplexing an output from a narrowband laser with optical power transmitted by said partially reflective component, wherein said narrowband laser generates an output beam of a lower wavelength than wavelengths generated by said plurality of gain elements.

11. A system, comprising:

a plurality of groups of multiple gain elements, wherein a respective drive signal is provided to each group to cause each gain element of the respective group to operate at substantially the same power within a region of optimal electrical efficiency, a diffractive element diffracting beams from said plurality of groups of multiple gain elements toward a partially reflective component;

said partially reflected component generating feedback directed toward said diffractive element;

said diffractive element directing spectral components of said feedback toward respective gain elements of said plurality of groups of multiple gain elements; and a Raman amplifier receiving optical power transmitted by said partially reflective component that generates substantially flat Raman gain across at least one telecommunication band.

12. The system of claim 11 wherein said plurality of groups of multiple gain elements are integrated on a single integrated semiconductor element.

13. The system of claim 11 wherein spacings between gain elements generating optical power of shorter wavelengths are smaller than spacings between gain elements generating optical power of longer wavelengths.

14. The system of claim 11 wherein said telecommunications band includes wavelengths from 1530 nm to 1565 nm.

15. The system of claim 11 wherein said telecommunications band includes wavelengths from 1480 nm to 1525 nm.

16. The system of claim 11 wherein said telecommunications band includes wavelengths from 1570 nm to 1610 nm.

17. The system of claim 11 wherein a first group of said plurality of groups is integrated on a first single semiconductor element and a second group of said plurality of groups is integrated on a second single semiconductor element.

18. The system of claim 17 wherein said diffractive element comprises a first diffraction grating and a second diffraction grating.

19. The system of claim 18 further comprising:

a dichoric beam combiner for combining beams from said first and second diffraction gratings before reflection by said partially reflective component occurs.

20. The system of claim 11 further comprising:

a narrowband laser for generating an output beam of a lower wavelength than wavelengths generated by said plurality of groups; and a multiplexer for multiplexing said narrowband laser with optical power transmitted by said partially reflective component.

* * * * *